(12) United States Patent
Cheng et al.

(10) Patent No.: US 7,921,218 B2
(45) Date of Patent: Apr. 5, 2011

(54) METHOD AND SYSTEM FOR GENERATING A SPACE SIGNATURE

(75) Inventors: Doreen Cheng, San Jose, CA (US); Yu Song, Pleasanton, CA (US); Swaroop Kalasapur, Sunnyvale, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 432 days.

(21) Appl. No.: 11/818,860

(22) Filed: Jun. 15, 2007

(65) Prior Publication Data

US 2008/0313320 A1  Dec. 18, 2008

(51) Int. Cl.
*G06F 15/16* (2006.01)
*G06F 15/173* (2006.01)

(52) U.S. Cl. ......... 709/229; 709/223; 709/224; 709/226

(58) Field of Classification Search .................. 709/218, 709/228, 229, 230, 238, 243
See application file for complete search history.

(56) References Cited

U.S. PATENT DOCUMENTS

| | | | |
|---|---|---|---|
| 7,213,057 B2 | 5/2007 | Trethewey et al. | |
| 7,221,939 B2 | 5/2007 | Ylitalo et al. | |
| 7,263,560 B2 * | 8/2007 | Abdelaziz et al. | 709/238 |
| 7,509,131 B2 | 3/2009 | Krumm et al. | |
| 2003/0100307 A1 | 5/2003 | Wolochow et al. | |
| 2005/0221844 A1 * | 10/2005 | Trethewey et al. | 455/456.6 |
| 2007/0134641 A1 | 6/2007 | Lieu | |
| 2008/0043000 A1 * | 2/2008 | Currid et al. | 345/179 |
| 2008/0248809 A1 | 10/2008 | Grower | |
| 2008/0256097 A1 | 10/2008 | Messer et al. | |

OTHER PUBLICATIONS

"Location API for Java™ 2 Micro Edition, Version 1.0.1," JSR 179 Expert Group, Java Community Process, Feb. 23, 2006, 94 pages.
U.S. Office Action for U.S. Appl. No. 11/787,464 mailed on Jun. 8, 2009.
U.S. Non-final Office Action for U.S. Appl. No. 11/787,464 mailed on Sep. 16, 2010.
U.S. Non-Final Office Action mailed on Feb. 24, 2010 for U.S. Appl. No. 11/787,464.

* cited by examiner

*Primary Examiner* — Quang N. Nguyen
(74) *Attorney, Agent, or Firm* — Kenneth L. Sherman, Esq.; Michael Zarrabian, Esq.; Myers Andras Sherman & Zarrabian LLP

(57) ABSTRACT

A method and system implementing a process for generating a signature for a network space using existing resources in the space. The process for generating a signature for a space involves discovering the resources in the space and generating a signature for the space using the identification of the devices.

50 Claims, 7 Drawing Sheets

METHOD AND SYSTEM FOR GENERATING A SPACE SIGNATURE

FIELD OF THE INVENTION

The present invention relates to characterizing spaces in networks for identification and more particularly relates to generating signatures for spaces.

BACKGROUND OF THE INVENTION

A space can be physical or virtual. A physical space typically correlates with a physical location and has a postal address. A virtual space does not have to correspond to any particular physical location; it may, however, contain one or more physical locations. On the other hand, a physical location may also contain one or more virtual spaces. A space generally contains networked digital devices which host contents and services. The devices, contents and services are collectively called resources. Resources can move within the space and can move in and out of the space.

In order to identify a space, the space must be characterized. A first conventional approach to characterize a space utilizes only a name to characterize a space. This approach typically uses a beacon which periodically broadcasts the name of the space. The broadcast can be used by receiving devices to identify the space. However, using beacon broadcasts requires installing, configuring, and maintaining beacons in all spaces of significance. Such infrastructural setup and maintenance is costly and time consuming.

A second conventional approach to characterize a space uses data generated from extra sensors, and optionally a user-entered label/tag/name to characterize the space. For example a sensor such as a global positioning satellite (GPS) receiver is used to gather the geo-coordinates of the space. The coordinates can be used to find the postal address of the space. Alternatively, the user can manually enter a name (e.g., "home", "office") for the space. The drawback of this approach is that GPS receivers do not function well in indoor situations and urban areas, and require maintaining of large databases.

A third conventional approach to characterize a space utilizes information from wireless sources, e.g., using cell tower identifications (IDs) and WiFi access point IDs. The drawback of using a cell tower ID is unpredictable resolution since the distance between a device in a space and the tower depends on which tower is connected. Using WiFi access points provides better resolution, but still requires maintaining large databases that map the access point IDs to physical coordinates or postal addresses.

Such conventional approaches are for identifying physical spaces only, and not suitable for identifying virtual spaces. Therefore, there is a need for a method and system for identifying a virtual network space

BRIEF SUMMARY OF THE INVENTION

The present invention provides a method and system for generating a signature for characterizing a space using resources existing in the space for use. In one embodiment, a process for generating a signature for a space involves discovering one or more, and preferably every, resource in the space and generating a signature for the space using the identifications of the resources. Such signature based on the resources can be used for identifying the space and/or assisting user tasks. Preferably each of one or more resources includes a universally unique identifier (UUID). Where the resources do not include such a UUID, the present invention further includes providing a UUID for every networked resource that is reachable in a space.

As resources can move in and out of a space, the process for generating a signature for a space may further include verifying that the resources identified in the signature are still in the space, updating a set of currently researchable resources based on the verification, and generating a new (updated) signature for the space using the UUIDs of the resources in the updated set.

These and other features, aspects and advantages of the present invention will become understood with reference to the following description, the appended claims and the accompanying figures.

DETAILED DESCRIPTION OF THE INVENTION

The present invention provides a method and system for generating a signature for a space using networked resources already in the space for use. The space can be a physical space or a virtual space, and may include subspaces. The signature can be used to identify the spaces. The signature generation process does not require use of additional sensors installed specifically for identifying the space, and therefore, sensor installation and maintenance costs are reduced/eliminated.

According to the present invention, a space signature can be generated in various ways depending on the planned use of the signature. For example, if the signature is used to identify a space with relatively stable and distinct characteristics (e.g., home and work), then a hash value of the UUIDs of reachable resources can be used to generate a signature. If on the other hand, the signature is used to identify a space that is frequently changing or with shared reachable resources (e.g., the office versus the lab); a list of original resource UUIDs can be utilized for generating the signature.

In addition, the type of resources included in generating a signature may vary with the purpose of the signature. For example, resources reachable with longer range networks, e.g., WiFi, can be used for distinguishing larger size adjacent spaces, whereas resources reachable with shorter range networks, e.g., Bluetooth, can be used to further distinguish smaller spaces. The signature of a space can also contain the location information of the space which can comprise information about a virtual location and/or a physical location.

Figure 1:
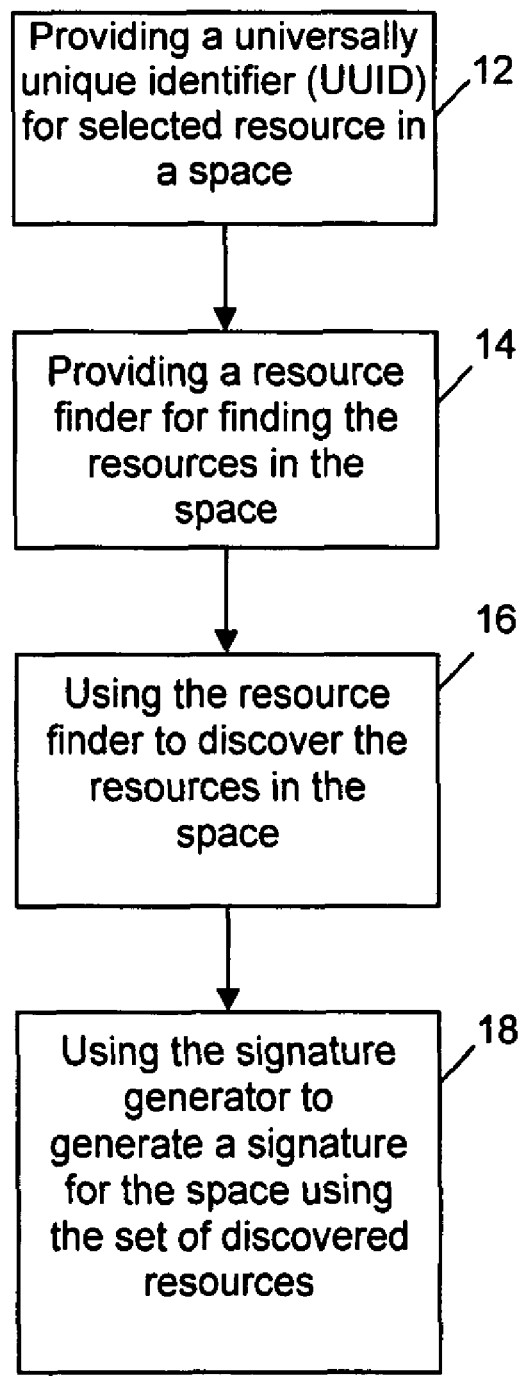
FIG. 1 shows a flowchart of the steps of an example process for generating a space signature, according to the present invention

FIG. 1 shows a flowchart of the steps of an example process 10 for generating a space signature, according to the present invention, including the steps of:

Step 12: Providing a universally unique identifier (UUID) for selected resources in a space.

Step 14: Providing a resource finder for finding the resources in the space.

Step 16: Using the resource finder to discover the resources in the space

Step 18: Using the signature generator to generate a signature for the space using the set of discovered resources Examples of a UUID include a Media Access Control (MAC) address of a device, a UPnP UUID, etc. Examples of the mechanisms that can be used by the resource finder include resource access commands provided by a network platform, a resource discovery mechanism in the DHCP, a resource discovery mechanism in the UPnP protocol, etc.

Examples of the signature include a hash value of all the UUIDs and an ordered list of the hash values of each UUID of selected reachable resources. The signature can also contain the location information of the space, e.g., geo-coordinates, postal addresses and user-given names.

Figure 2:
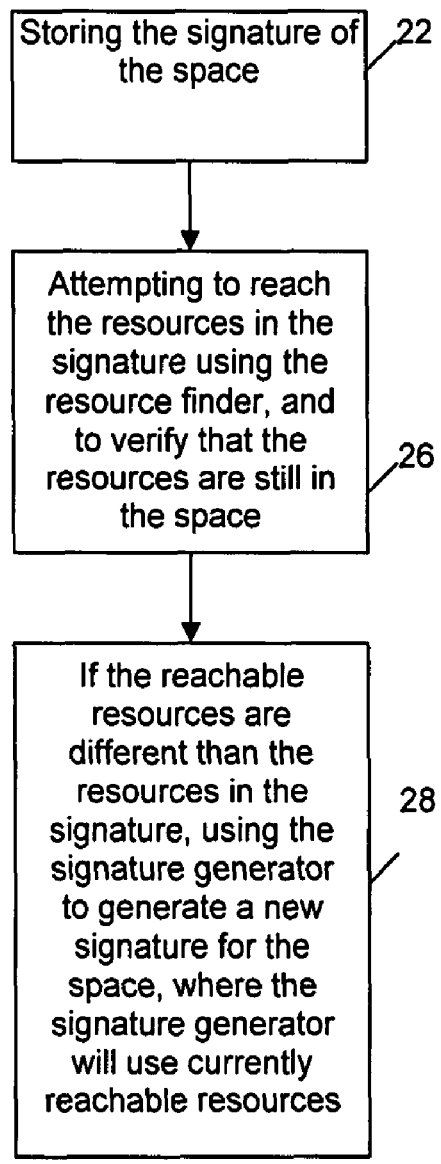
FIG. 2 shows a flowchart of the steps of an example process for updating and generating a new signature for a space when resources in the space have changed, according to the present invention.

Since resources can move in and out of a space, the signature of the space may change from time to time. FIG. 2 shows a flowchart of a process 20 to account for this situation, including the steps of:

Step 22: Storing the signature of the space.

Step 26: Thereafter, from time to time or based on an event, utilizing the resource finder to attempt to reach the resources in the signature using the resource finder and to verify that the resources are still in the space.

Step 28: If the reachable resources are different than the resources in the signature, using the signature generator to generate a new signature for the space, where the signature generator will use currently reachable resources. Otherwise, a new signature is not needed.

If the resources in the network already posses UUIDs, then the step of providing UUIDs for the resources is not necessary. Examples of the mechanisms that can be used by the resource finder for reaching resources include the "ping" mechanism in IP networks, the "iwlist scan" in WiFi networks, and the "hcitool scan" in Bluetooth networks.

Optionally the space signature can include location information, e.g., virtual location information, a subset or full set of the physical location information defined in the Location API for the Java 2 Platform, Micro Edition (JSR179). The location information can be obtained in various ways. For example, it can be assigned by a user; it can be obtained from a resource such as a location server that contains the location information; it can be obtained by querying an Internet database such as Loki and PlaceLab, using information contained in the signature such as the MAC address of a wireless access point (AP); it can also be obtained by using reasoning over the resources, etc.

Figure 3:
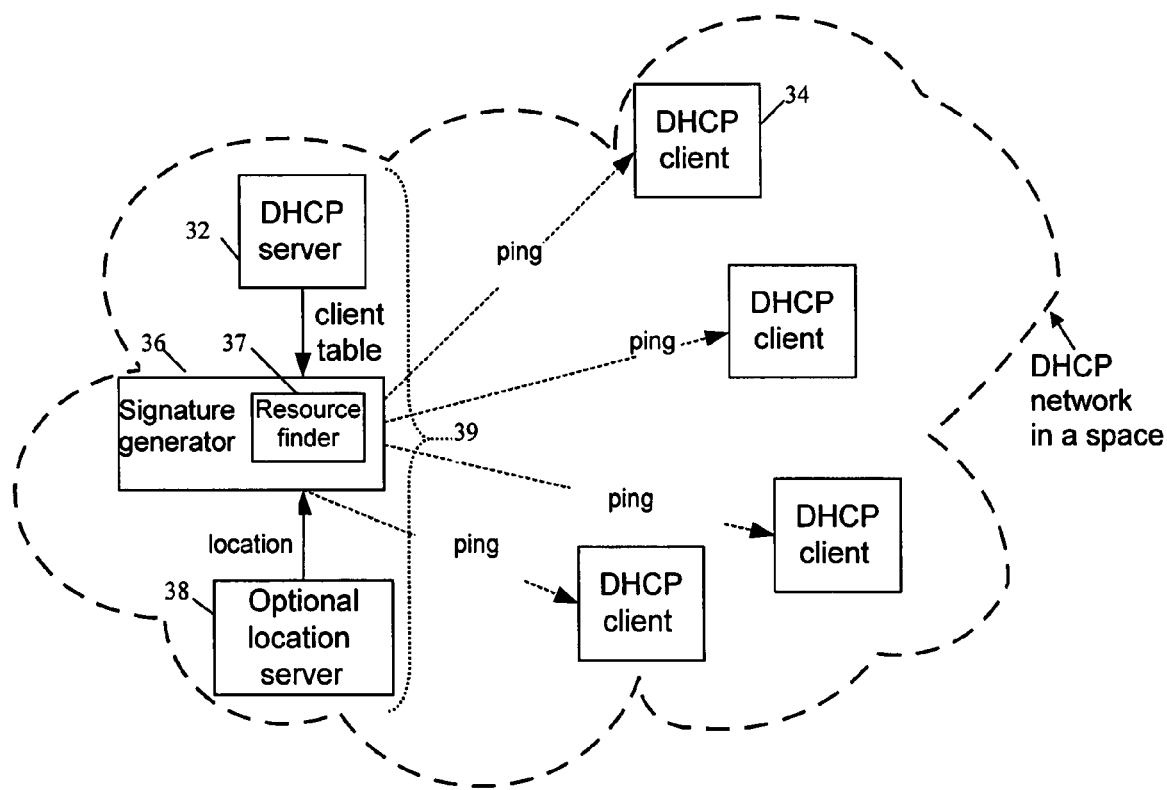
FIG. 3 shows a functional block diagram of an example system that uses the Dynamic Host Configuration Protocol (DHCP) to find resources and generate a signature for a space, according to the present invention.

FIG. 3 shows a functional block diagram of a first example networked system 30 in a space, wherein the system 30 implements a process for generating a signature as described (e.g., FIGS. 1-2), using the DHCP for resource discovery, according to the present invention. The system 30 includes a DHCP server 32 and at least one DHCP client 34. In this example, the DHCP server 32 and the DHCP client 34 are logical modules (e.g., software modules) that can be implemented in a single device or can be implemented in different devices. Preferably, the DHCP server 32 is implemented in one of the devices in the networked space, and each DHCP client 34 is implemented on a separate device in the networked space. The devices are connected via wired and/or wireless IP-based networking technology such as WiFi, Ethernet, etc.

A signature generator module 36 implements the process for generating a space signature using the network resources as described above (e.g., in relation to FIGS. 1-2). The signature generator 36 includes a resource finder 37 that finds the reachable resources in the networked space by using DHCP to obtain a DHCP client table from the DHCP server 32, and constructs a list of a set of reachable resources by pinging all or a subset of the resources in the client table to determine if they are reachable. In this example, each of one or more resources in the networked space includes a DHCP client 34.

The signature generator 36 is a logical/functional module and is preferably implemented on the same device 39 where the DHCP server is implemented. The signature generator 36 can also be implemented on a different device, which may require performing authentication with the DHCP server in order to fetch the client table.

Optionally, the networked space 30 can include a location server 38 that generates location information about the space and provides an interface for querying the location information. The location server 38 can generate location information using one or more ways described above. The location server 38 can be implemented on any device in the network 30, but is preferably co-located with the signature generator module 36 in the same device 39.

Figure 4:
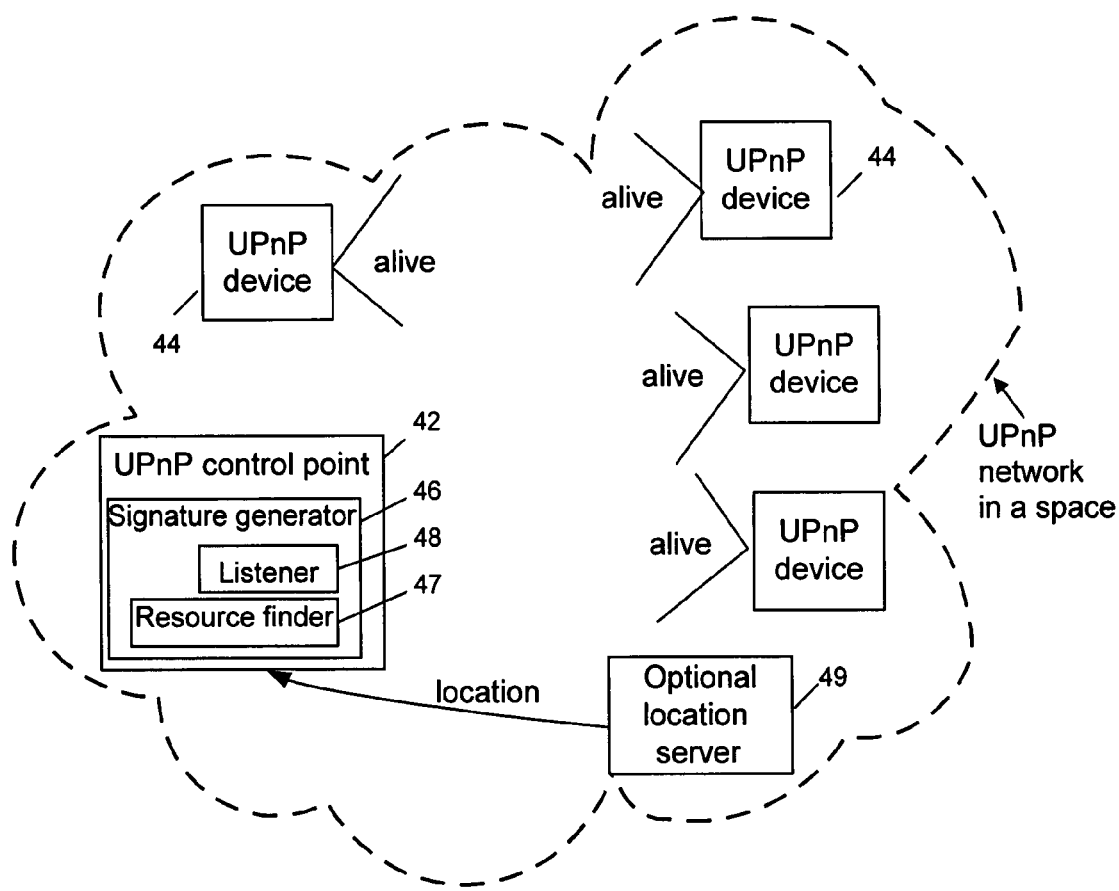
FIG. 4 shows a functional block diagram of an example system that uses the Universal Plug and Play (UPnP) protocol to find resources and generate a signature for a space, according to the present invention.

FIG. 4 shows a functional block diagram of a second example network system 40 in a space that implements a process for generating a signature for the space, using the UPnP protocol to find resources in the space, according to the present invention. The system 40 includes at least one UPnP control point 42 and one or more UPnP devices 44, connected via wired and/or wireless IP-based networking technologies such as WiFi and Ethernet.

A signature generator module 46 implements a process for generating a signature for the networked space as described (e.g., FIGS. 1-2), and includes a resource finder 47 that discovers reachable resources (e.g., one or more UPnP devices 44) in the space by using UPnP protocols, e.g., using a listener 48 for listening to the multicast Simple Service Discovery Protocol (SSDP) alive messages, and constructing a list of a set of the reachable resources.

The signature generator module 46 is a logical module and preferably a component of the UPnP control point 42. An optional location server 49 can be used to generate location information about the space and provide an interface for querying the location information. The location server 49 is a logical module that can be implemented in a UPnP device 44, or co-located with the UPnP control point 42, and is preferably co-located with the signature generator module 46.

Figure 5:
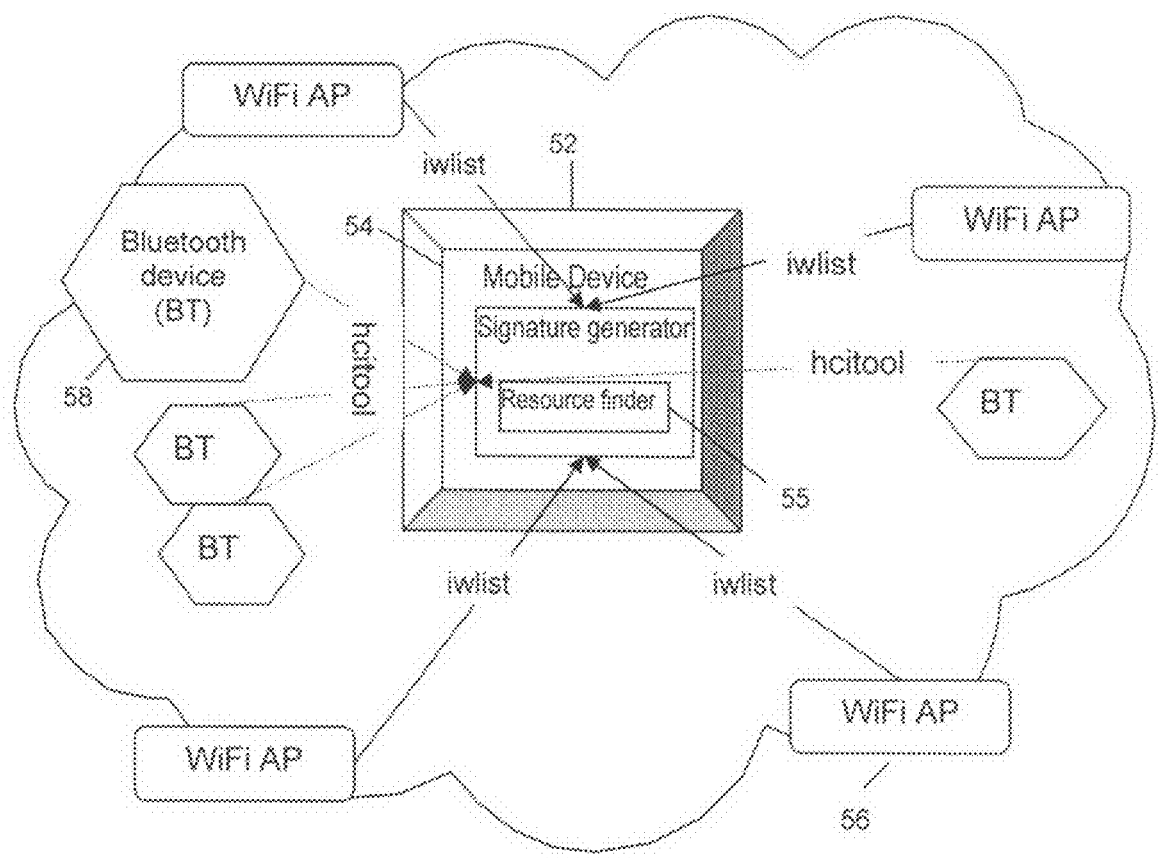
FIG. 5 shows a functional block diagram of an example system that uses wireless platform commands to find resources connected through WiFi and Bluetooth networks in a space and to generate a signature for the space, according to the present invention.

FIG. 5 shows a third example network system 50 that implements a process for generating a signature for a space using network platform commands to find resources, according to the present invention. The system 50 interacts with a visiting mobile device 52, and resources in a space connected by wireless networks, such as WiFi AP 56 and Bluetooth device 58. In this example the mobile device 52 is a wireless device (e.g., wireless consumer electronics device).

A signature generator module 54 implements a process for generating a signature for the space (e.g., FIGS. 1-2). The signature generator module 54 includes a resource finder 55 that discovers reachable resources 56, 58 in the space by using the "iwlist scan" command for WiFi resources 56, using the "hcitool scan" command for Bluetooth resources 58, and constructing a list of a set of the reachable resources, as described. The signature generator module 54 is preferably implemented on the mobile device 52. The signature generator module 54 can also be implemented in another device in the network.

As those skilled in the art will recognize, a signature generator according to the present invention can be distributed on multiple devices. In this case the signature of the space is distributed and stored on these devices, wherein an overall signature is generated from the distributed signatures. An example of generating an overall signature is to first concatenate together the same type of distributed pieces of the signature and then concatenate the pieces together to form the signature.

Figure 6:
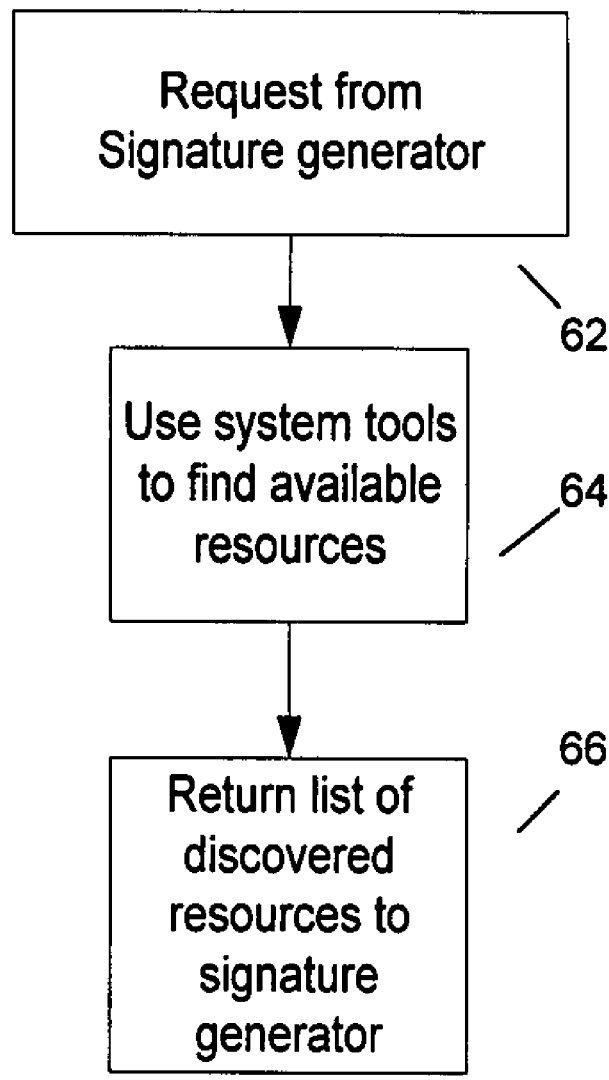
FIG. 6 shows a process implemented by a resource finder, according to an embodiment of the present invention.

An implementation of a resource finder according to the present invention is now further described. As noted, a space is characterized by the presence of a number of resources. Each space can contain a set of such resources that uniquely identify that space. It is the responsibility of the resource finder to identify such resources and gather their unique identifiers (UUIDs). FIG. 6 shows a process 60, implemented by a resource finder, according to an embodiment of the present invention. In step 62, the resource finder receives a request for resource identification from the signature generator. In step 64, the resource finder queries the resources in the space and generates a list of available/visible resources. The resource finder can employ a number of steps in finding resources. For example, if the signature is to be stored within the space itself, as shown in FIG. 3, the resource finder can directly utilize the discovery mechanisms available through DHCP and/or UPNP protocols. In such cases, the resource finder is equipped with appropriate access methods to interact with the concerned network elements (e.g., the DHCP server or the UPNP control point device). When no such network elements exist, or when the resource finder is implemented on a mobile device, the resources are directly gathered by the resource finder. The resource finder can then employ system tools available to identify resources over the network. Examples of such system tools include "ping" within IP networks, "iwlist scan" within WiFi networks and "hcitool scan" to find the Bluetooth resources. In step 66, the resource finder returns a resulting list of resources that are available within a space to the signature generator.

As noted, the signature generator is responsible for collecting the discovered UUIDs and storing them as signatures for the space. It is also the responsibility of this component to verify the collected signatures to determine if the space is already known. If the space signature is new, the signature generator also stores the new signature as an identifier for the current space.

The signature generator works in conjunction with the resource finder and maintains the signature for a space in a format that is convenient in terms of storage, retrieval and verification. An example storage format can employ a mechanism where the UUIDs are hashed and the results are stored as signatures. Another mechanism can be directly storing the UUIDs as they are, and also maintaining the nature of the corresponding resource (such as a Bluetooth device, UPNP device, etc). The signature generator is also responsible for extracting the stored signatures and converting them back to the original UUID during the space identification operation.

Figure 7:
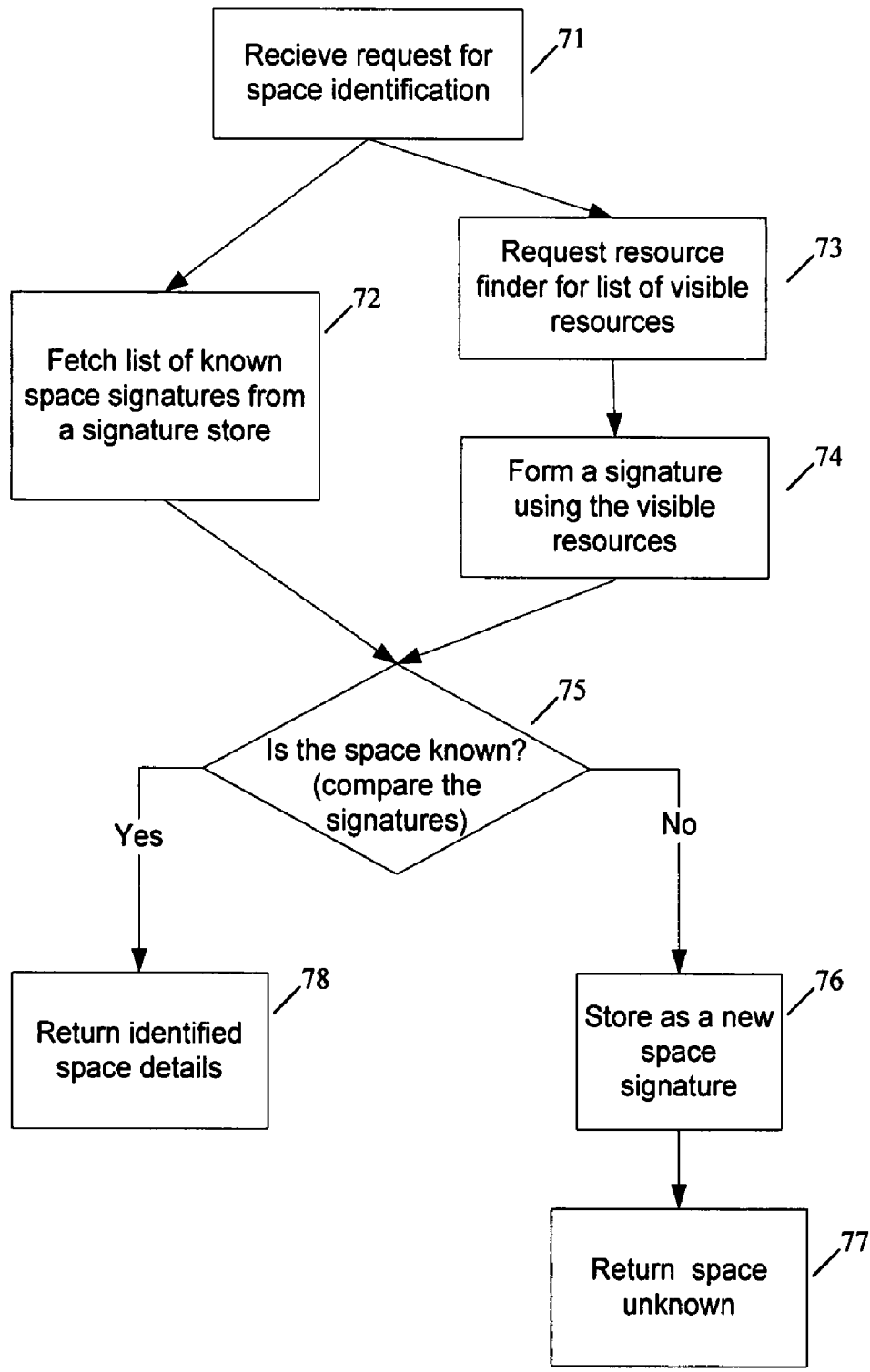
FIG. 7 shows a process implemented by a signature generator, according to an embodiment of the present invention.

FIG. 7 shows a process 70 implemented by the signature generator, according to an embodiment of the present invention:
  Step 71: Receive a request for space identification.
  Step 72: Fetch the list of known space signatures from a signature store, go to step 75.
  Step 73: Request a resource finder for a list of visible resources.
  Step 74: Form a signature using the visible resources.
  Step 75: Determine if the space is known by comparing the signatures. If the space is not known go to step 76, otherwise go to step 78.
  Step 76: Store as a new space signature.
  Step 77: Return space unknown. End.
  Step 78: Return identified space details. End.

Although the example embodiments described herein use IP-based and Bluetooth based networks, the present invention is applicable to network spaces that use other networking technologies, e.g., 1394, USB, etc. The space can be a physical space or a virtual space, and may include subspaces. The signature can have different uses. For example, the signature can be used to identify the space, or to assist a user with the resources available in the space. When the space is a physical space, the signature can also be used for deriving the physical address of the space and its landmarks. The signature generation process does not require the use of additional sensors or user input. Since generating the signature only uses the existing resources in the space, sensor installation and maintenance costs are reduced/eliminated.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of generating a signature for a space using networked resources in the space, comprising:
  employing a processor for
    discovering resources in the space;
    providing a universally unique identifier (UUID) for every resource in the space;
    generating a signature for the space using identifications of the set of discovered resources by generating an ordered list of the hash values of each UUID of selected reachable resources and a hash value of all the UUIDs;
    verifying that a previously set of discovered resources remain in the space, wherein verifying comprises one of: periodically verifying that a previously set of discovered resources remain in the space, and based on an event, verifying that a previously set of discovered resources remain in the space;
    updating the set of discovered resources as necessary based on the verification; and
    if the set of discovered resources is different than resources in the signature for the space, then generating an updated signature for the space based on the identification of the resources in the updated set;
    wherein the signature includes information based on a range of reachable resources which is used for distinguishing a size of a space.

2. The method of claim 1 wherein the resources include one or more of devices, content and services.

3. The method of claim 1 wherein:
  the space includes subspaces;
  discovering resources in the space further includes discovering resources in each subspace; and generating a signature for the space further includes: generating a signature for each subspace using the identifications of the set of discovered resources in each subspace, and generating a signature for the space based on the subspace signatures.

4. The method of claim 1 wherein the space comprises a physical space such that the signature provides the location of the space.

5. The method of claim 1 wherein the resources comprise existing resources in the space.

6. The method of claim 1 wherein verifying includes attempting to reach each resource in the space, such that if a resource cannot be reached, then it is assumed the resource no longer remains in the space.

7. The method of claim 1 wherein the UUID includes a Media Access Control (MAC) address of a resource.

8. The method of claim 1 wherein the UUID includes a Universal Plug and Play (UPnP) UUID of a resource.

9. The method of claim 1 wherein generating the signature further includes generating an ordered list of the hash values of the UUIDs and a list of name-value pairs, wherein the name represents the resource.

10. The method of claim 9 wherein the name of a resource allows access to the resource.

11. The method of claim 1 wherein generating the signature further comprises including location information for the space in the signature, the location information including information about a virtual space.

12. The method of claim 1 wherein:
the network space implements a Dynamic Host Configuration Protocol (DHCP) network including a DHCP server and one or more DHCP clients;
discovering resources includes obtaining a DHCP client table from the DHCP server, and constructing a list of a set of reachable resources by pinging all or a subset of the resources in the client table to determine if they are reachable; and
generating the signature further includes computing a space signature using the identification list of the set of reachable resources.

13. The method of claim 1 wherein:
the network space implements a UPnP network including a UPnP control point and one or more UPnP resources;
discovering resources includes discovering reachable resources using UPnP protocols, and constructing a list of a set of the reachable resources; and
generating the signature further includes computing a space signature using the identification list of the set of reachable resources.

14. The method of claim 1 wherein:
the network space implements a wireless network including wireless resources;
discovering resources includes discovering reachable resources using wireless protocols, and constructing a list of a set of the reachable resources; and
generating the signature further includes computing a space signature using the identification list of the set of reachable resources.

15. The method of claim 14 wherein generating the signature further includes generating the signature in a wireless device in the network.

16. The method of claim 1 wherein the resources include content.

17. The method of claim 1 wherein generating the signature further includes generating the signature based on a purpose of the signature.

18. The method of claim 1, wherein the space is a virtual space.

19. The method of claim 18, wherein identification of the virtual space is performed without sensors or receivers.

20. An apparatus for generating a signature for a space using networked resources in the space, comprising:
at least one computer processing unit (CPU);
a resource finder configured to discover resources in the space, wherein a plurality of resources each include a universally unique identifier (UUID) for every resource in the space;
a signature generator configured for generating a signature for the space using identifications of the set of discovered resources by generating an ordered list of the hash values of each UUID of selected reachable resources and a hash value of all the UUIDs;
the resource finder is further configured to verify that a previously set of discovered resources remain in the space, wherein verifying comprises one of: periodically verifying that a previously set of discovered resources remain in the space, and based on an event, verifying that a previously set of discovered resources remain in the space; and to update the set of discovered resources as necessary based on the verification; and
the signature generator is further configured such that if the set of discovered resources is different than resources in the signature for the space, then the signature generator generates an updated signature for the space based on the identification of the resources in the updated set;
wherein the signature includes information based on a range of reachable resources which is used for distinguishing a size of a space.

21. The apparatus of claim 20 wherein the resources include one or more of devices, content and services.

22. The apparatus of claim 20 wherein:
the space includes subspaces;
the resource finder is further configured to discover one or more resources in each subspace; and
the signature generator is further configured to generate a signature for each subspace using the identifications of the set of discovered resources in each subspace, and to generate a signature for the space based on the subspace signatures.

23. The apparatus of claim 20 wherein the space comprises a physical space such that the signature provides the location of the space.

24. The apparatus of claim 20 wherein the resources comprise existing resources in the space.

25. The apparatus of claim 20 wherein the resource finder is further configured to attempt to reach each resource in the space, such that if a resource cannot be reached, then it is assumed the resource no longer remains in the space.

26. The apparatus of claim 20 wherein resource identification includes a MAC address of a resource.

27. The apparatus of claim 20 wherein resource identification includes a UPnP UUID of a resource.

28. The apparatus of claim 27 wherein the signature generator is further configured for generating a list of name-value pairs, wherein the name represents the resource.

29. The apparatus of claim 28 wherein the name of a resource allows access to the resource.

30. The apparatus of claim 20 wherein the signature generator is further configured to generate a signature that further includes location information for the space in the signature.

31. The apparatus of claim 20 wherein:
the network space implements a Dynamic Host Configuration Protocol (DHCP) network including a DHCP server and one or more DHCP clients;
the resource finder is further configured to obtain a DHCP client table from the DHCP server, and construct a list of a set of reachable resources by pinging all or a subset of the resources in the client table to determine if they are reachable; and
the signature generator is further configured to generate the signature by computing a space signature using the identification list of the set of reachable resources.

32. The apparatus of claim 20 wherein:
the network space implements a UPnP network including a UPnP control point and one or more UPnP resources;
the resource finder is further configured to discover reachable resources using UPnP protocols, and construct a list of a set of the reachable resources; and
the signature generator is further configured to compute a space signature using the identification list of the set of reachable resources.

33. The apparatus of claim 20 wherein:
the network space implements a wireless network including wireless resources;
the resource finder is further configured to discover reachable resources using wireless protocols, and constructing a list of a set of the reachable resources; and
the signature generator is further configured to generate a space signature using the identification list of the set of reachable resources.

34. A system for generating a signature for a space using networked resources in the space, comprising:
at least one computer processing unit (CPU);
a network of multiple resources;
a resource finder configured to discover resources in the space, wherein a plurality of resources each include a universally unique identifier (UUID) for every resource in the space;
a signature generator configured for generating a signature for the space using identifications of the set of discovered resources by generating an ordered list of the hash values of each UUID of selected reachable resources and a hash value of all the UUIDs;
the resource finder is further configured to verify that a previously set of discovered resources remain in the space, wherein verifying comprises one of: periodically verifying that a previously set of discovered resources remain in the space, and based on an event, verifying that a previously set of discovered resources remain in the space; and to update the set of discovered resources as necessary based on the verification; and
the signature generator is further configured such that if the set of discovered resources is different than resources in the signature for the space, then the signature generator generates an updated signature for the space based on the identification of the resources in the updated set;
wherein the signature includes information based on a range of reachable resources which is used for distinguishing a size of a space.

35. The system of claim 34 wherein the resources include one or more of devices, content and services.

36. The system of claim 34 wherein:
the space includes subspaces;
the resource finder is further configured to discover one or more resources in each subspace; and
the signature generator is further configured to generate a signature for each subspace using the identifications of the set of discovered resources in each subspace, and to generate a signature for the space based on the subspace signatures.

37. The system of claim 34 wherein the space comprises a physical space such that the signature provides the location of the space.

38. The system of claim 34 wherein the resources comprise existing resources in the space.

39. The system of claim 34 wherein verifying includes attempting to reach each resource in the space, such that if a resource cannot be reached, then it is assumed the resource no longer remains in the space.

40. The system of claim 34 wherein resource identification includes a MAC address of a resource.

41. The system of claim 34 wherein resource identification includes a UPnP UUID of a resource.

42. The system of claim 34 wherein the signature generator is further configured to generate a list of name-value pairs, wherein the name represents the resource.

43. The system of claim 42 wherein the name of a resource allows access to the resource.

44. The system of claim 34 wherein the signature generator is further configured to generate a signature that further includes location information for the space in the signature.

45. The system of claim 34 wherein:
the network space implements a Dynamic Host Configuration Protocol (DHCP) network including a DHCP server and one or more DHCP clients;
the resource finder is further configured to obtain a DHCP client table from the DHCP server, and construct a list of a set of reachable resources by pinging all or a subset of the resources in the client table to determine if they are reachable; and
the signature generator is further configured to generate the signature by computing a space signature using the identification list of the set of reachable resources.

46. The system of claim 34 wherein:
the network space implements a UPnP network including a UPnP control point and one or more UPnP resources;
the resource finder is further configured to discover reachable resources using UPnP protocols, and construct a list of a set of the reachable resources; and
the signature generator is further configured to compute a space signature using the identification list of the set of reachable resources.

47. The system of claim 34 wherein:
the network space implements a wireless network including wireless resources;
the resource finder is further configured to discover reachable resources using wireless protocols, and constructing a list of a set of the reachable resources; and
the signature generator is further configured to generate a space signature using the identification list of the set of reachable resources.

48. The system of claim 47 wherein the signature generator is implemented in a wireless device in the network.

49. A method of generating a signature for a space using networked resources in the space, comprising:
employing a processor for
discovering resources in the space by obtaining a Dynamic Host Configuration Protocol (DHCP) client table from the DHCP server, and constructing a list of a set of reachable resources by pinging all or a subset of the resources in the client table to determine if they are reachable, wherein the resources comprise devices, content and services;

providing a universally unique identifier (UUID) for every resource in the space;

generating a signature for the space using identifications of the set of discovered and reachable resources by generating an ordered list of the hash values of each UUID of selected reachable resources and a hash value of all the UUIDs, wherein the space implements a network including a DHCP server and one or more DHCP clients;

verifying that a previously set of discovered resources remain in the space, wherein verifying comprises one of: periodically verifying that a previously set of discovered resources remain in the space, and based on an event, verifying that a previously set of discovered resources remain in the space;

updating the set of discovered resources as necessary based on the verification; and if the set of discovered resources is different than resources in the signature for the space, then generating an updated signature for the space based on the identification of the resources in the updated set;

wherein the signature includes information based on a range of reachable resources which is used for distinguishing a size of a space.

50. A method of generating a signature for a space using networked resources in the space, comprising:

employing a processor for discovering resources in the space by discovering reachable resources using UPnP protocols, and constructing a list of a set of the reachable resources, wherein the resources comprise devices, content and services;

providing a universally unique identifier (UUID) for every resource in the space;

generating a signature for the space by computing a space signature using the identification list of the set of reachable resources and by generating an ordered list of the hash values of each UUID of selected reachable resources and a hash value of all the UUIDs, wherein the space implements a network including a UPnP control point and one or more UPnP resources;

verifying that a previously set of discovered resources remain in the space, wherein verifying comprises one of: periodically verifying that a previously set of discovered resources remain in the space, and based on an event, verifying that a previously set of discovered resources remain in the space;

updating the set of discovered resources as necessary based on the verification; and if the set of discovered resources is different than resources in the signature for the space, then generating an updated signature for the space based on the identification of the resources in the updated set;

wherein the signature includes information based on a range of reachable resources which is used for distinguishing a size of a space.

\* \* \* \* \*